United States Patent [19]

Sasaki et al.

[11] Patent Number: 4,737,634

[45] Date of Patent: Apr. 12, 1988

[54] FILTER FOR PHOTOELECTRIC TOUCH PANEL INCLUDING LIGHT SCATTERING OR ABSORBING PROTRUSIONS

[75] Inventors: Hiroaki Sasaki; Kazuo Hasegawa, both of Furukawa, Japan

[73] Assignee: Alps Electric Co., Ltd., Japan

[21] Appl. No.: 853,616

[22] Filed: Apr. 18, 1986

[30] Foreign Application Priority Data

Apr. 18, 1985 [JP] Japan .................. 60-83202

[51] Int. Cl.⁴ ............................................ G01V 9/04
[52] U.S. Cl. .................... 250/221; 250/222.1
[58] Field of Search ............... 250/221, 222.1, 237, 250/239, 208, 209; 340/555, 556, 557

[56] References Cited

U.S. PATENT DOCUMENTS

| | | | |
|---|---|---|---|
| 3,478,220 | 11/1969 | Milroy | 250/221 |
| 3,764,813 | 10/1973 | Clement et al. | 250/221 |
| 3,775,560 | 11/1973 | Ebeting et al. | 178/6.8 |
| 4,590,410 | 5/1986 | Jonsson | 250/222.1 |

Primary Examiner—David C. Nelms
Attorney, Agent, or Firm—Guy W. Shoup

[57] ABSTRACT

A filter for a photoelectric touch panel disposed in front of arrays, formed on a framework on the circumference of a screen, of aligned light emitting elements and photosensitive elements characterized in that the same is provided with protrusions around the center of its portions in front of these arrays.

2 Claims, 1 Drawing Sheet

FILTER FOR PHOTOELECTRIC TOUCH PANEL INCLUDING LIGHT SCATTERING OR ABSORBING PROTRUSIONS

BACKGROUND OF THE INVENTION

1. Field of the Invention

The present invention relates to a filter for photoelectric touch panel adapted to form a matrix of infrared beams in front of its screen and, when a finger or a pen touches the screen, the infrared beams corresponding to the touched position are shielded and the coordinates are input to a computer.

2. Description of the Prior Art

As a filter for a photoelectric touch panel of the described type such as shown in FIG. 4 has in general been in use. Referring to FIG. 4, 1 denotes a filter. The filter 1 formed into a frame and having a smooth surface is disposed in front of arrays 2 and 2a of aligned LEDs 3, 3 as light emitting elements and aligned phototransistors 4, 4 as photosensitive elements. The arrays are arranged on a framework on the circumference of a screen.

Now, chiefly concerning the LEDs 3 and phototransistors 4 located at end portions of the arrays 2 and 2a, it is found out that, while some beams of light emitted from the LEDs 3 will straightly advance and be properly received by the phototransistors 4, some other beams emitted from the same will advance so as to be reflected at around the center of the filter portion 1b perpendicularly crossing the filter portion 1a disposed in front of the LED 3 and erroneously received by the phototransistors 4. In such a case, even if the beam advancing straight can be shielded, the shielding is not effected as an input to a computer and such was a cause of malfunction of the apparatus in the prior art.

SUMMARY OF THE INVENTION

A primary object of the invention is to solve the mentioned problem in the prior art and to provide a filter for a photoelectric touch panel which eliminates the possibility of the mentioned receipt of the reflected beam and avoid the resultant malfunction.

In order to attain the above mentioned object, the filter of the invention is provided with a protrusion at around the center of its portion at each side.

DESCRIPTION OF THE PREFERRED EMBODIMENT

Figure 1:
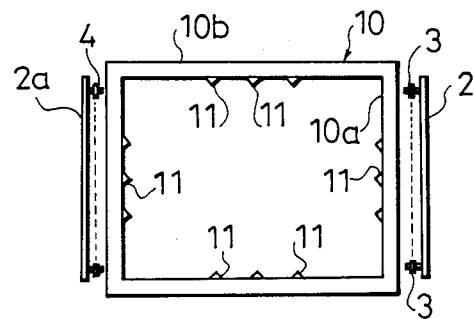
FIG. 1 is a front view of a filter according to the invention.
Figure 2:
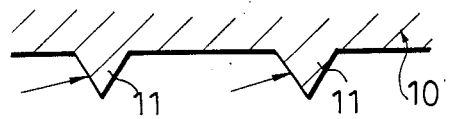
FIG. 2 is an enlarged cross-sectional view showing principal portion of the same.
Figure 3:
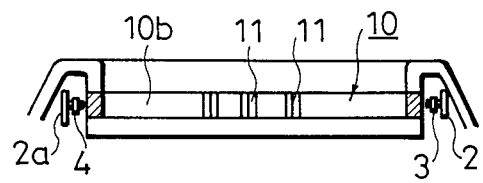
FIG. 3 is a vertical cross-sectional view showing the same.
Figure 4:
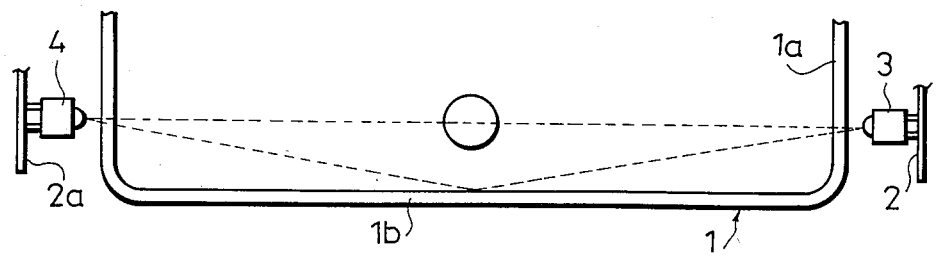
FIG. 4 is a front view showing portion of a filter of the prior art.

A preferred embodiment of the invention will be described with reference to accompanying drawings in the following.

Referring to the drawing, 10 denotes a filter according to the invention. Although the position of installation of the filter 10 is the same as before, this filter 10 is provided with a plurality of triangular pyramidal protrusions 11, 11, . . . formed around the center of its portion at each side. The protrusions 11, 11, . . . cause the beams emitted, chiefly, by the LEDs 3 located at the end portion of the array 2 and diverged to the portion 10b of the filter which perpendicularly crosses the portion 10a of the filter disposed in front of the LEDs 3 to be scattered and thus enable only the beams advancing straight to be properly received by the opposing phototransistors 4.

By the way, the protrusions 11 have been described to be of triangular pyramidal form in the above description of the embodiment, but the same is not limited to be of that form. What is needed is only that the diverged beams will be scattered or absorbed by the protrusions so as not to be received by the phototransistor 4. And, it is naturally enough for the described purpose if there is at least one protrusion provided.

According to the invention, as described above, it is attained that only the beam of light advancing straight is received by the corresponding photosensitive element and entering into the same of a reflected beam can be avoided. Therefore, the shielding of the beams in the matrix of the infrared beams is correctly input to the computer and the malfunction can thus be eliminated.

What is claimed is:

1. An improved filter for a photoelectric touch panel having a first array of light emitting elements, a first array of light receiving elements, a second array of light emitting elements, and a second array of light receiving elements, wherein each array of light emitting elements is disposed on an opposite side of a rectangular display screen from the corresponding array of light receiving elements, such that each light receiving element is capable of receiving a light beam transmitted straight from a respective light emitting element, and wherein the first pair of arrays are arranged on opposite sides of the display screen which are perpendicular to the sides on which the second pair of arrays are arranged, the two perpendicularly arranged pairs of opposing arrays thereby forming a grid of light beams in front of the display screen for detecting the presence of a pointing object interposed in the grid, said filter being formed in a rectangular frame having two perpendicularly arranged pairs of opposing sides which are each disposed in front of a respective one of said two pairs of opposing arrays for performing a filtering function, wherein the improvement comprises each side of said frame having a plurality of spaced apart projections formed substantially in a central part thereof facing toward the grid area of the display screen, said projections being positioned on each one side so as not to interfere with transmittal of light beams to or from said one side from or to its opposing side, and having a shape and dimension so as to scatter or absorb light beams which are not transmitted straight to or from a perpendicularly arranged side from or to a perpendicularly arranged opposing side.

2. A filter according to claim 1, wherein said projections are each formed as a triangular pyramidical protrusion from the side of the filter frame.

* * * * *

UNITED STATES PATENT AND TRADEMARK OFFICE
CERTIFICATE OF CORRECTION

PATENT NO. : 4,737,634

DATED : April 12, 1988

INVENTOR(S) : Hiroaki Sasaki, Kazuo Hasegawa

It is certified that error appears in the above-identified patent and that said Letters Patent is hereby corrected as shown below:

Title page:

Add the name of the third inventor:

-- Junichi Ouchi, Furukawa, Japan --.

Signed and Sealed this

Fifth Day of September, 1989

Attest:

DONALD J. QUIGG

*Attesting Officer*　　　*Commissioner of Patents and Trademarks*